July 23, 1935.　　　　　L. HERSOT　　　　　2,009,179
BRAKE
Filed March 20, 1929　　　7 Sheets-Sheet 1
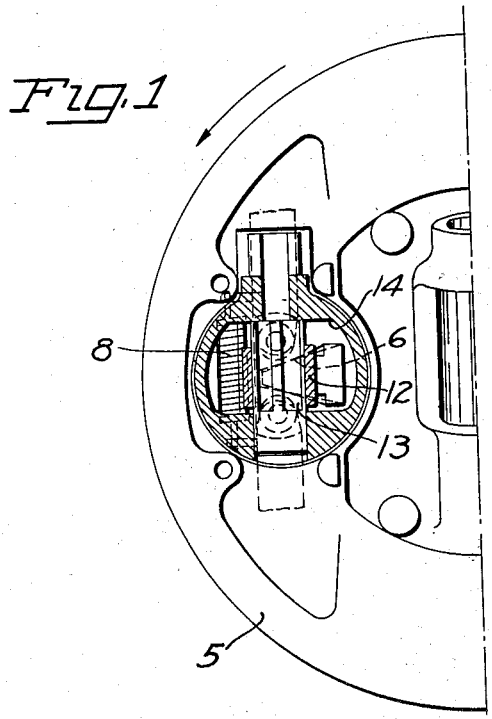
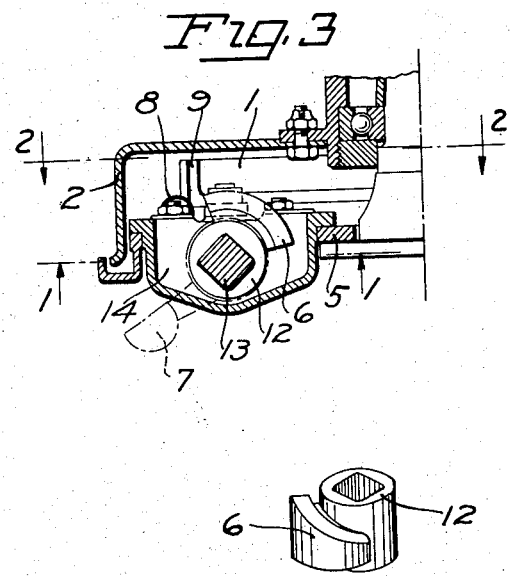
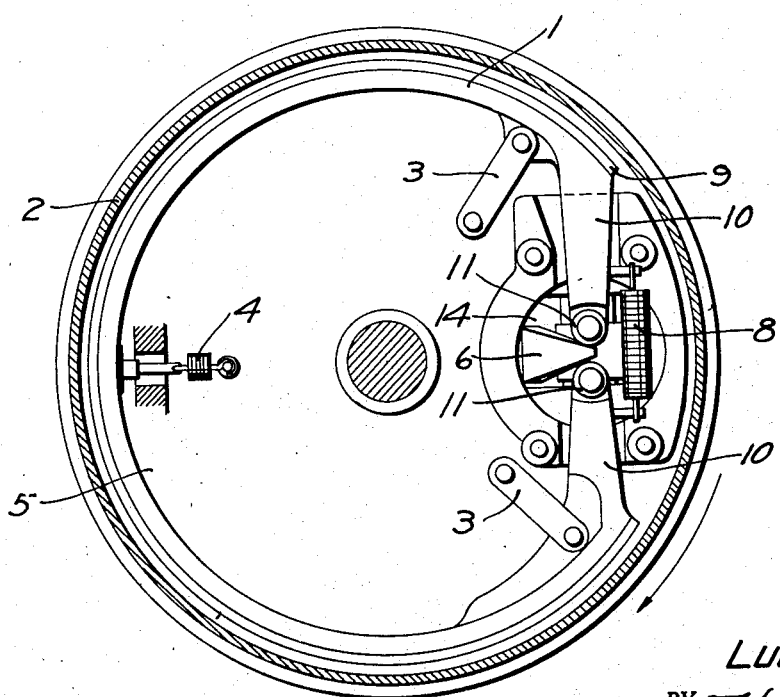
INVENTOR.
LUCIEN HERSOT
BY H. Q. Blayton
ATTORNEY

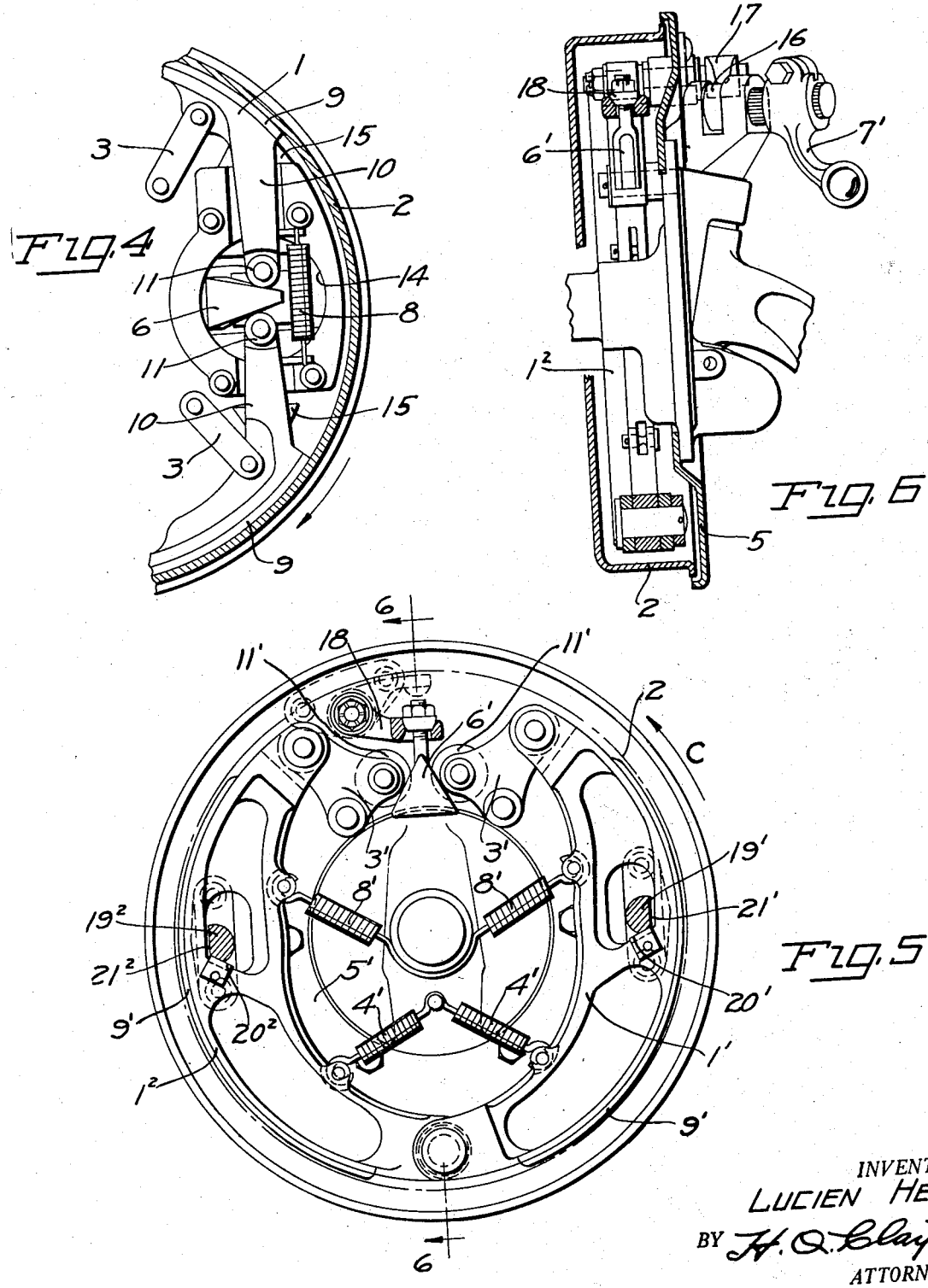

July 23, 1935.  L. HERSOT  2,009,179
BRAKE
Filed March 20, 1929   7 Sheets-Sheet 3
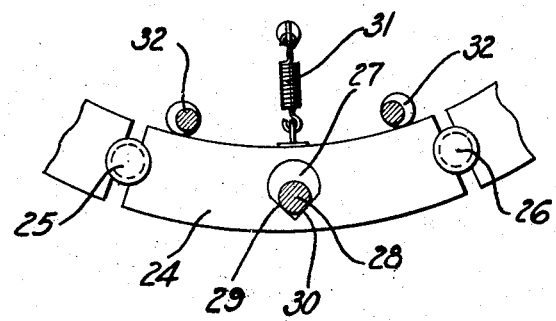
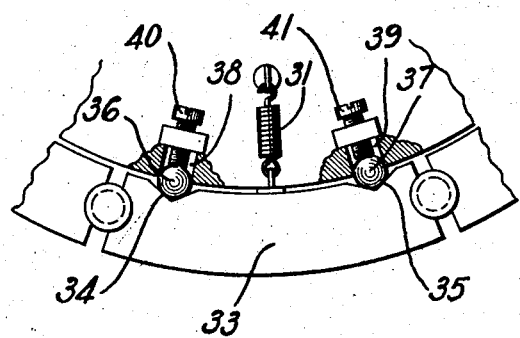
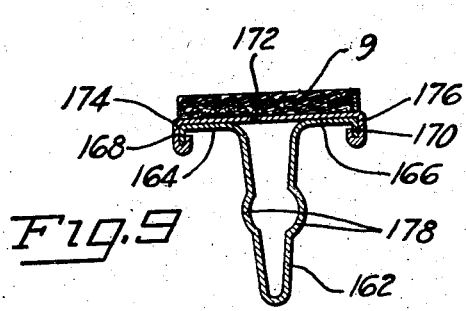
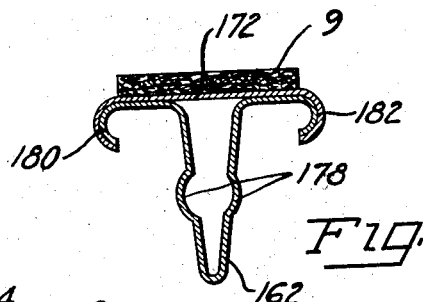
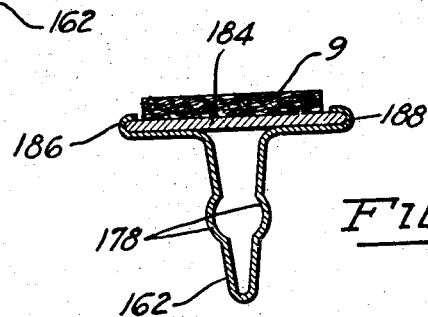
INVENTOR.
LUCIEN HERSOT
BY H. Q. Blayton
ATTORNEY

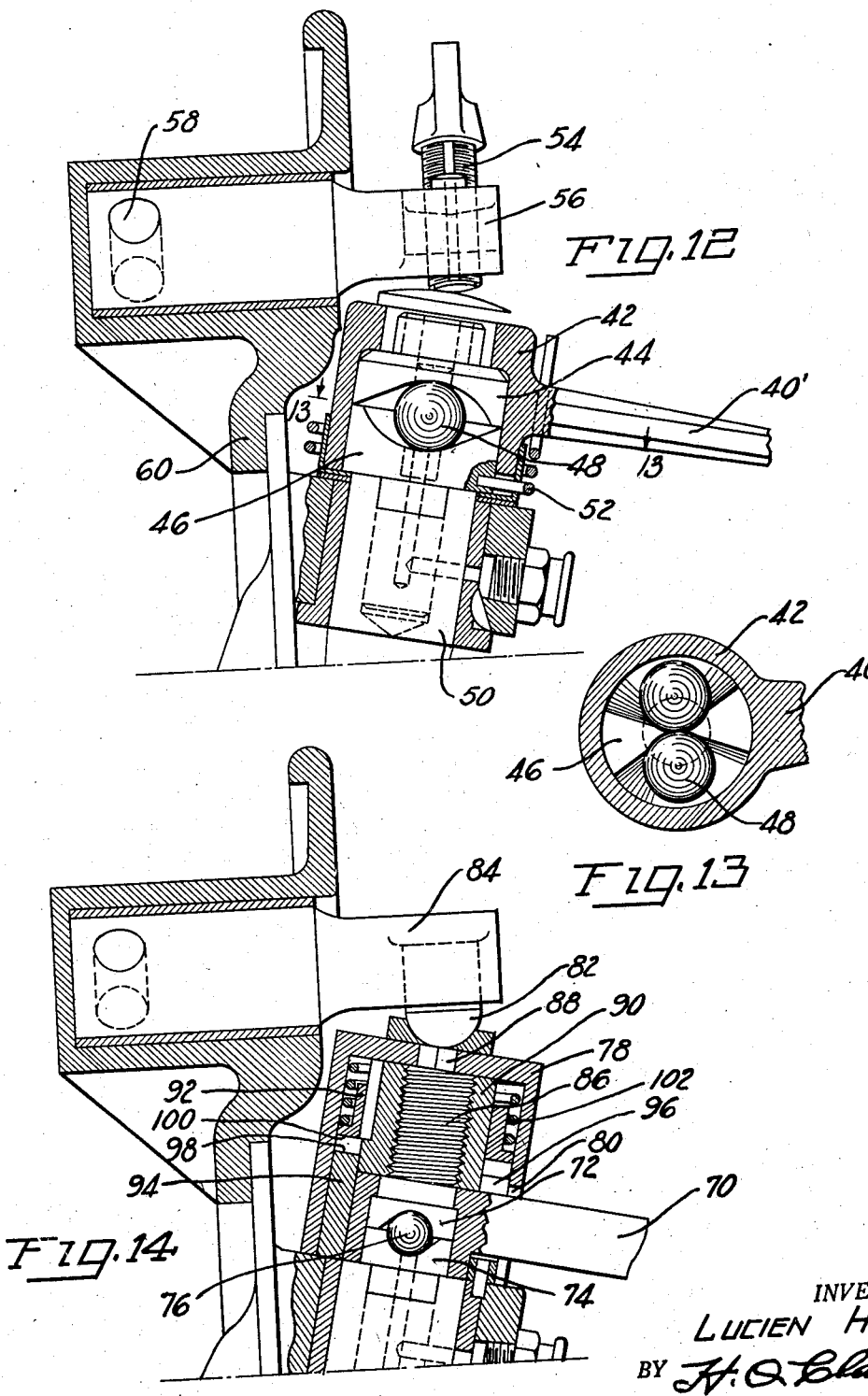

July 23, 1935.  L. HERSOT  2,009,179
BRAKE
Filed March 20, 1929    7 Sheets-Sheet 5

INVENTOR.
LUCIEN HERSOT
BY H. Q. Clayton
ATTORNEY

July 23, 1935. L. HERSOT 2,009,179
BRAKE
Filed March 20, 1929 7 Sheets-Sheet 6
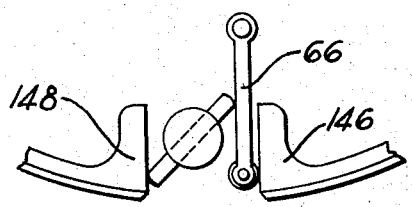
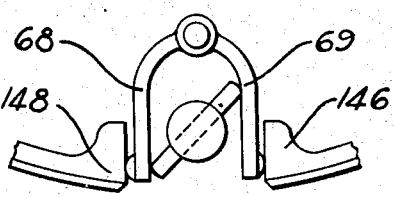
Fig.22  Fig.23
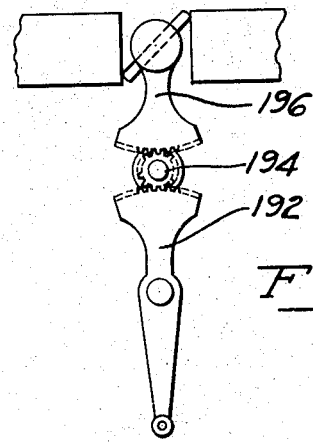
Fig.24
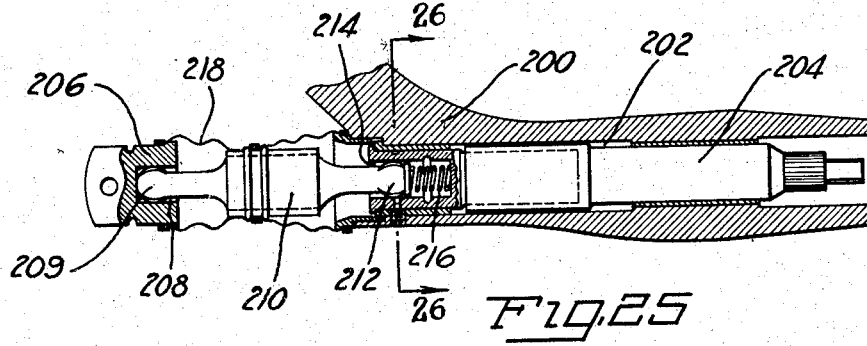
Fig.25
Fig.26
INVENTOR.
LUCIEN HERSOT
BY H. Q. Clayton
ATTORNEY

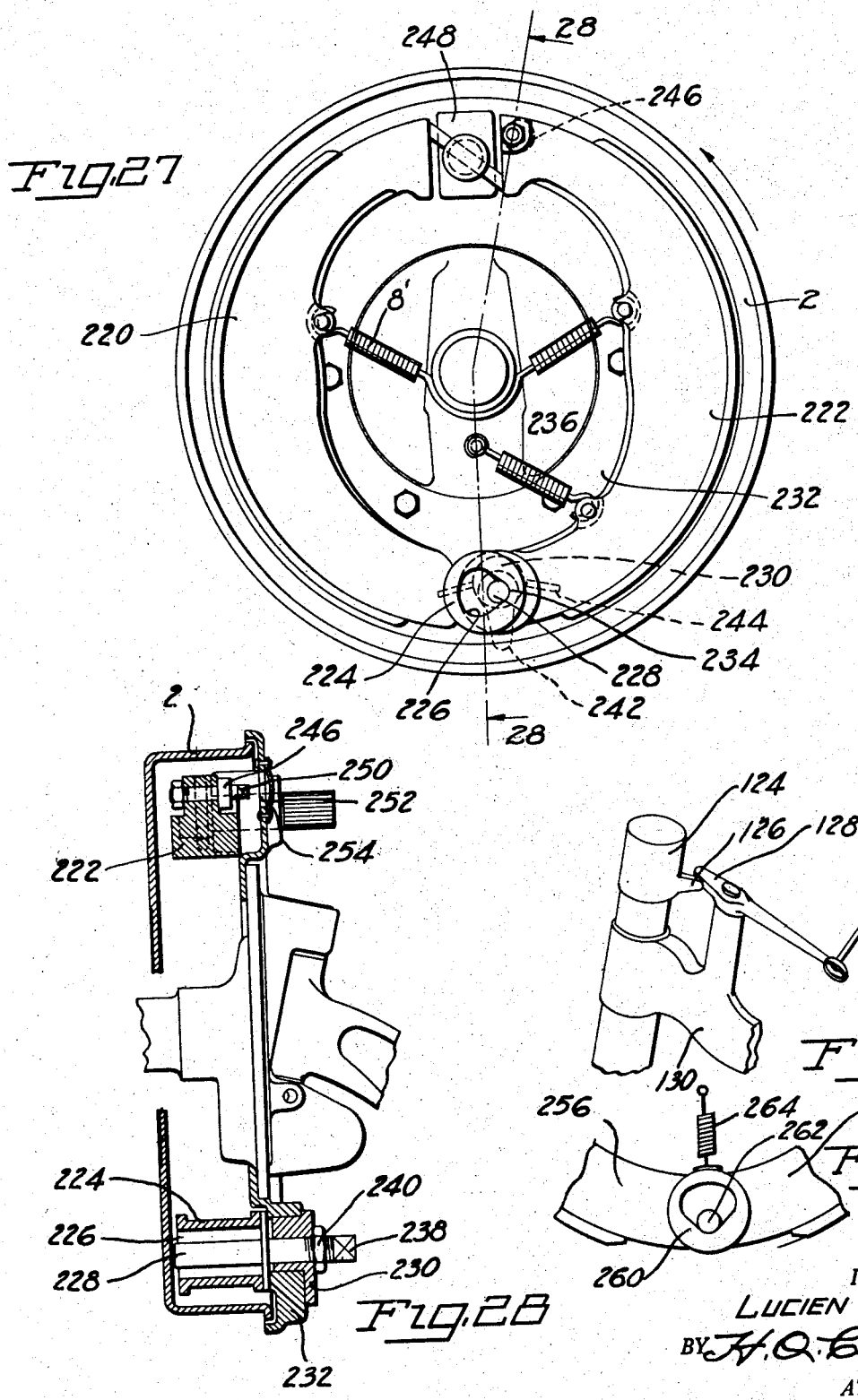

Patented July 23, 1935

2,009,179

UNITED STATES PATENT OFFICE 2,009,179

BRAKE

Lucien Hersot, Paris, France, assignor to Bendix Brake Company, Chicago, Ill., a corporation of Illinois Application March 20, 1929, Serial No. 348,392
In Belgium April 2, 1928

15 Claims. (Cl. 188—78)

This invention relates to braking mechanisms and more particularly to those of the internal expanding type, although certain arrangements of the invention may be applied to brakes of other types.

One object of the invention is to provide a dependable brake which may be easy to operate and which incorporates certain details which make the brake mechanism more practical.

Another object of the invention is to provide means for expanding a friction shoe against its cooperating drum with a pressure sufficient to transfer rotating torque of the drum to the shoe and in employing such torque to further apply the friction shoe.

A further object of the invention is to provide a means for expanding the friction shoe which means may be readily shiftable in a substantially circumferential direction, without affecting the actuation of the applying means.

Another object of the invention is to provide a novel brake shoe of inexpensive construction and in which a worn lining may be readily replaced with a new one with great facility.

Another object of the invention is to provide a brake applying means having provision therein for automatically adjusting or taking up for wear in the brake thereby maintaining the brake uniformly adjusted throughout its life.

Another object of the invention is to provide applying means acting at various points along the friction shoes so as to provide more uniform distribution of pressure around the brake shoe.

A further object of the invention is to provide novel forms of applying means adapted for the front dirigible wheels of a vehicle.

The above and other novel features of the invention will appear more fully hereinafter from the following detailed description when taken in connection with the accompanying drawings. It is expressly understood, however, that the drawings are employed for purposes of illustration only and are not designed as a definition of the limits of the invention, reference being had for this purpose to the appended claims.

In the drawings, wherein similar reference characters refer to similar parts throughout the several views, Figure 1 is a rear elevation partly in section of a portion of the brake showing a form of applying means;

Figure 2 is a section through the front brake drum showing the elements of the brake in elevation;

Figure 3 is a section taken substantially on line 3—3 of Figure 2;

Figure 3a is a perspective showing of a cam employed in Figures 1, 2 and 3;

Figure 4 is a slightly modified form of the brake shown in Figures 1, 2 and 3;

Figure 5 is an elevation of a further modified form of a brake with the drum removed;

Figure 6 is substantially a section of Figure 5 taken on the line 6—6;

Figure 7 shows a modified detail applicable to the brakes of Figures 5 and 6;

Figure 8 is a further modified form similar to Figure 7;

Figures 9, 10 and 11 show cross sections of a novel form of brake shoe adapted to the brakes illustrated herein;

Figure 12 is a section through the steering knuckle and brake of a vehicle front wheel illustrating a novel actuating mechanism;

Figure 13 is a section on line 13—13 of Figure 12;

Figure 14 is a modification of Figure 12 illustrating the application of an automatic adjustment;

Figures 22 and 23 illustrate novel actuating means which may also be employed in the various brake constructions;

Figure 24 is a diagrammatic showing of a further novel actuating means adapted for association with a vehicle swivel steering wheel;

Figure 25 is a still further form of brake operating mechanism adapted for a vehicle swivel steering wheel;

Figure 26 is a section on the line 26—26 of Figure 25;

Figure 27 is a modification of a form of brake shown in Figure 5;

Figure 28 is a section taken on the line 28—28 of Figure 27;

Figure 29 is a further variation of applying means for a vehicle steering wheel particularly adapted for use in the structures of vehicles 12 and 14; and Figure 30 is a modified form of a pivotal connection for a pair of brake shoes.

Figure 15:
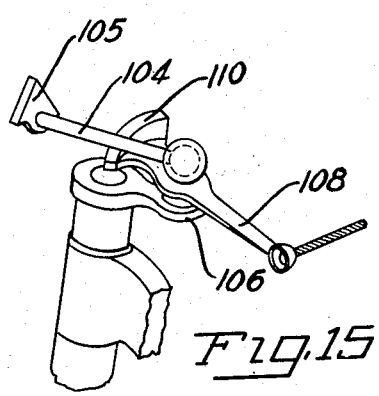
Figure 15 is a further modified form of apparatus adapted to actuate the brakes of the vehicle front wheel.

Referring to the drawings and more particularly to Figures 1, 2, 3, and 3a there is shown therein one form of brake comprising a backing plate 5 having a pair of links 3 pivoted thereto carrying the spreadable ends 10 of the internal expanding friction band 1. A lining 9, which may be secured to the friction band 1 in any suitable manner, is adapted to engage a revolving brake drum 2. To maintain the brake band normally in release position a spring 8 is tensioned between spreadable ends 10, together with a spring 4 secured between the center of the friction band and the backing plate.

Set in the backing plate 5 is a cam housing 14 which carries therein a splined or square shaft 13 arranged in a tangential or chordal arrangement adjacent the spreadable ends 10 of the internal expanding brake, and freely splined on said shaft is a cam actuator comprising a hub 12 and cam 6 provided with opposed spiral surfaces.

The spiral surfaces of the cam 6 are arranged adjacent to and between the spreadable ends, 10, and preferably engage rollers 11 mounted on the ends of the friction band. In order to actuate the brake the shaft 13 may extend outside the housing 14 and carry thereon an operating lever 7, the extremity of which in the case of a dirigible or swivel vehicle wheel, may be located on the king pin axis of the wheel in a manner hereinafter set forth.

In Figure 4, there is shown a slightly modified form wherein the friction band is provided with shoulders 15 which are adapted to engage against the exterior of the housing 14 and anchor the friction band thereagainst.

In Figures 5 and 6 there is shown a modified form of brake wherein the friction means comprises a pair of friction shoes 1' and 1² pivoted together at one end and secured at their separable ends to pivoted links 3' in the form of bellcranks. By means of springs 4', the friction shoes are held floatingly in engagement with the backing plate 5' and a double spring 8' tensioned between shoes 1' and 1² looped around the axle is adapted to normally retain the brake shoes in release position. In a central portion of each of the brake shoes, apertures 21' and 21² are provided through which extend anchor pins 19' and 19², each of which is provided with inclined slopes or ramps 20' and 20² against which one or the other of the brake shoes bear during a brake application.

To actuate the brake, a cam 6' carried by the operating lever 18 is adapted to engage rollers 11' on the bellcrank levers 3', and spread the friction shoes 1' and 1². In operation, upon spreading the friction shoes into engagement with the brake drum 2, assuming rotation in the direction of the arrow C, shoe 1' will engage the anchor 19', and due to the slope 20' thereof, the shoe will be forced into engagement with the drum, thereby increasing the engagement pressure, and acting to a certain extent as a servo brake. The anchor slope is not so great, however, as to interfere with free releasing of the brake.

As shown in Figure 6, wherein the brake of Figure 5 is shown dirigibly or swivelly mounted on a vehicle axle, there is provided an operating lever 7' journalled in a support fixed to the axle, which actuates a lever 16 in turn engaging a lever 17 operatively fixed to the shaft of cam operating lever 18. Preferably the engagement between levers 16 and 17 is restricted substantially to a point in line with the steering wheel king pin axis.

In lieu of the pivoted connection between the shoes 1' and 1² shown in Figure 5, an additional central link or shoe may be provided as shown in Figures 7 and 8. As illustrated in Figure 7 the link 24 is pivotally connected to the adjacent friction shoes as at 25 and 26, and is provided with a central aperture 27 through which an anchor 28 projects.

The aperture 27 is preferably provided with inclined or sloped edges 29 and 30 which tend to drive the link or shoe radially outward upon movement in either direction due to braking torque. A return spring 31 normally retains the shoe in release position against a pair of adjustable eccentric stops 32.

The alternative form of Figure 8 employs a link or shoe 33 notched along its inner periphery as at 34 and 35 so as to engage rollers 36 and 37. Sockets 38 and 39 provided with adjusting screws 40 and 41 are adapted to hold the rollers in place and provide a suitable adjustment for the link or shoe.

As shown in Figures 9, 10 and 11, the friction members of the various modified forms of brakes illustrated may be constructed from a single piece of metal folded and pressed into an arcuate section having a V cross section with laterally extending flanges. In Figure 9, the shoe comprises a V sectioned member 162 having laterally extending flanges 164 and 166 and radially extending flanges 168 and 170. An arcuate face member 172 to which a lining 9 is secured in any suitable manner such as by rivets and the like, is provided along its edges with flanges 174 and 176 having inturned edges, adapted to engage the radial flanges 168 and 170. The V sectioned member may be stiffened by a suitable longitudinal or arcuate rib 178 as shown. In Figure 10 is shown a similar construction wherein the flanges 180 and 182 are circular and the face member is provided with corresponding circular or rolled flanges. Figure 11 shows a shoe wherein the free member 184 is flat and is enveloped at its edges by suitable inturned flanges 186 and 188 on the V shaped member. In each of these shoes, the face member may be adapted for removal by sliding circumferentially with respect to the V shaped member, thereby permitting easy removal of worn lining and face member and replacement of a new one.

A novel actuating mechanism, adapted for dirigible wheels is illustrated in Figure 12, wherein an operating lever 40' is adapted to rotate a cap member 42 within which is located a pair of opposed inclined ball races 44 and 46 and balls 48. The upper race therein is secured against rotation relative to the cap member and the lower race is fixed against rotation in any suitable manner, and carried above the king pin 50. A coil return spring 52 is adapted to urge the lever normally to release position. Upon rotation of the lever 40' the inclined ball race 44 is adapted to be displaced from the lower race thereby raising the cap member and in turn raising the adjustment screw 54 and rotating the crank 56 and brake actuating cam shaft 58 located in the swivelled brake backing plate 60. Since the adjusting screw preferably contacts the cap member 42 substantially on the swivel axis of the king pin the actuation of the brake becomes substantially insensitive to the swivelling of the brake.

A modification of the form of Figure 12 is shown in Figure 14, wherein means are provided within the cap for automatically taking up slack resulting from wear of the parts. Although in the form of Figure 12, larger balls 48 may be placed therein to compensate for wear, in the construction of Figure 14, a pair of threaded members are provided which are adapted to raise the cap member as wear takes place.

As illustrated, a lever 70 adapted to rotate an inclined ball race member 72 relative to a stationary inclined ball race member 74 separated by a pair of balls 76, as in Figure 12, is provided to produce a vertical movement. A cap member 78 provided with a slot 80 of a width equal to that of the lever 70 is adapted to actuate a lever arm 82 carried by the brake actuating cam shaft 84. An exteriorly threaded member 86 having a square end shank 88 is set in a corresponding recess in the top of the cap member 78 so as to rotate therewith. Provided in threaded engagement with the member 86 is an interiorly threaded member 90 having a sleeve 92 slidably splined thereabout. A sleeve 94, fixed against rotation and having a slot 96 providing a limiting means for the movement of lever 70 is provided with ratchet teeth 98 on its upper edge which are adapted to engage complementary ratchet teeth 100 on the lower edge of the splined sleeve 92. A spring 102 located within the cap is adapted to urge the ratchet sleeve 92 into engagement with the fixed sleeve 94.

In operation, rotation of the lever 70 rotates the cap member 78, threaded members 86 and 90, and ratchet sleeve 92. The ratchet teeth 98 and 100 are arranged so that the pitch is slightly less than the movement permitted of lever 70 so that when lever 70 rotates through its full arc as limited by the slot 96 in the fixed sleeve 94, the ratchet sleeve 92 will skip over one tooth of the stationary ratchet 98, so that upon return or brake release movement, the sleeve 92 and the threaded member 90 splined therewith will be prevented from turning thereby producing relative rotation between the threaded members resulting in an extending movement, which as wear takes place gradually increases the height of the cap member 78. Such an arrangement is adapted, through its small increments of adjustment, to maintain the brake constantly in a uniform state of adjustment.

Figure 15 is illustrative of another mechanism for actuating the brake of a swivelled wheel and comprises a link 104 having a wedge cam 105 on the end thereof so as to adapt it to extend within and actuate a brake of the type heretofore described. The link 104 is pivoted at its other end upon a fixed arm 106 secured at the axle knuckle and is adapted to be actuated by a lever 108 also pivoted on the fixed arm and carrying a cam 110 in engagement with the link.

Figure 16:
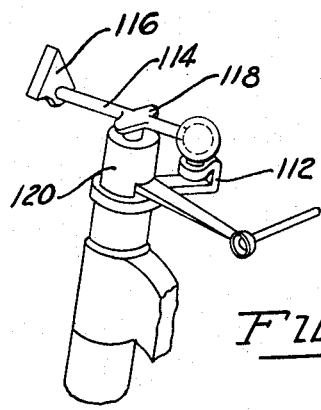
Figure 16 is another modification illustrating the application of the structures of Figures 12 and 14 to a brake of the type of Figures 1 to 6.

Figure 16 shows an adaptation of the actuating cam of the type shown in Figure 15 to the modifications of Figures 12 and 14. With a fixed support 112, link 114 having a wedge cam 116 at its extremity, is provided with a pad 118 so that the vertically movable cap 120 may actuate the brake the same regardless of the swivel position of the brake.

Figure 29 is a further illustration of a means for obtaining a greater movement of the cap member of Figures 12 and 14 by the use of a separate lever. As shown the cap member 124 is provided with an arm 126 which is adapted to engage the end of an operating lever 128 pivotally mounted on the axle 130.

Figures 17, 18:
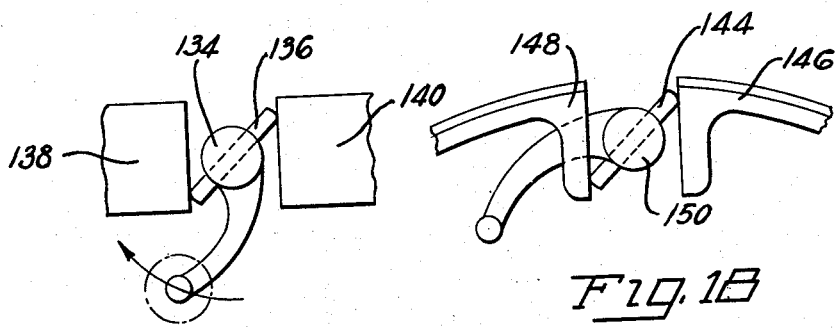
Figure 17 is a diagrammatic showing of an actuating mechanism for the friction means of the various brake constructions herein shown.
Figure 18 is another diagrammatic illustration of an actuating means for the various brake constructions herein shown.

Suitable cams for spreading the ends of the brake shoes are diagrammatically shown in Figures 17 and 18. In Figure 17 the cam shaft 134 carrying the cam member 136 engages the ends of the shoes 138 and 140, and the axis of the cam shaft lies in the plane of the brake shoes. By this arrangement equal action in forward and reverse may be obtained.

In Figure 18 the cam shaft axis is arranged parallel to the brake axis and the cam member 144 is adapted to engage and spread the shoe ends 146 and 148 upon rotation of the shaft 150. In either Figure 17 or 18, the cam members 138 and 144 respectively may float in the aperture in the shaft so as to permit equalized pressures on the two shoes.

Figure 19:
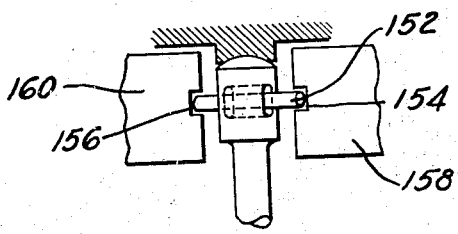
Figure 19 is a further modification of Figure 18, peculiarly adapted for operating the brakes of swivelled wheels.
Figures 20, 21:
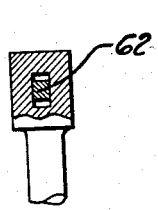
Figures 20 and 21 are sections showing modified details applicable to Figure 19.

In Figure 19, the slot in the cam shaft is elongated so as to permit swivelling of the brake relative to the cam shaft. As shown the pin 152 is maintained in proper position by radial grooves 154 and 156 in the shoe ends 158 and 160. As in Figure 20, the pin may be square, 62, or round, 63, and provided with a square bearing block 64 as in Figure 21.

In order to modify the action of a cam of the pin type illustrated in Figures 17–21, it may be desirable to actuate one shoe end through a lever 66 as shown in Figure 22, or through a pair of pivoted levers 68 and 69 as shown in Figure 23.

As a further modified form of operating means adapted for use in a swivelled wheel, a pair of sector gears as shown in Figure 24 may be provided. Therein a sector gear 192 pivoted on the axle may actuate a pinion 194 pivoted upon the swivel or king pin axis, which in turn may mesh with a sector gear and cam shaft member 196, which as shown has its axis lying in the plane of the brake as suggested in Figure 17.

The brake actuating cam may be operated through an arrangement including universal joints as illustrated in Figures 25 and 26. As shown, the front axle 200 is provided with a longitudinal bore 202 in which is rotatably mounted, in suitable bearings an operating shaft 204. A brake applying cam 206, which may be journalled in the brake backing plate and swivel therewith, with respect to the axle, is provided with a splined or square recess 208 into which the rounded square end 209 of an intermediate link 210 is slidably inserted. The link 210 is provided with a second squared end 212 inserted in a square recess 214 in the end of the shaft 204. The link 210 freely slides and swivels in the square recesses provided for it and permits angular movement between the brake operating cam and axle, while accurately transmitting the brake operating torque. A spring 216 is provided in the recess 214 to maintain the link seated in the socket 208, so that there may be no looseness or unnecessary movement thereof. The link 210 is also provided with a flexible corrugated cover 218 adapted to prevent the entry of dirt and foreign matter to the operating spindle.

Referring to Figures 27 and 28 a brake having modified details is shown, comprising a pair of brake shoes 220 and 222, which are pivoted together by means of a pivot pin 224, having an aperture 226 extending axially therethrough. An adjusting pin 228 secured to an eccentric member 230 mounted on the backing plate 232 is adapted to project into the pin aperture 226, and seat in a recess 234 provided in one side of the pivot pin aperture. Spring 236 tends to retain the brake shoes in normal released position and seat the recess 234 upon the adjusting pin during brake release. A squared head 238 together with the lock nut 240 provide means whereby the eccentric may be loosened so that the same can be rotated by the extension 242 within the arc limited by stops 244. As a further adjustment the shoe 222 is shown as provided with an eccentric 246 adapted to engage the actuating cam bracket 248 to vary the effective angular length of the shoe. Actuation of the eccentric is facilitated by the provision of a squared end 250, and a backing plate aperture 252, which as shown may be suitably covered with a plate 254.

The pivot pin of Figure 27 may be rotated through an angle of 90° and perform the function of the central shoe or link illustrated in Figures 7 and 8. As shown in Figure 30, the shoes 256 and 258 are connected by a hollow pivot pin 260 provided with inclined faces adapted to engage a fixed pin 262. Movement of the shoes in either direction tends to thrust them radially outward against the urge of spring 238.

Though several embodiments and modifications of the invention have been illustrated and described, it is to be understood that the invention is not limited thereto but may be embodied in various mechanical forms and arrangements. As various changes in construction and arrangement of parts may be made without departing from the spirit of the invention, as will be apparent to those skilled in the art, reference will be had to the appended claims for a definition of the limits of the invention.

The brake shown in Figures 12 to 16 inclusive and Figure 29 of the drawings is also shown and described and is claimed in my prior Patent No. 1,989,194 which was copending as an application with this application.

I claim:—

1. A brake comprising a plate, a floating expansible friction member, a cam movable in a plane normal to the plate for expanding the friction member, an operating shaft therefor, said cam slidably engaging said shaft.

2. A brake comprising a plate, a floating expansible friction member, a cam rotatable in a plane normal to the friction member for expanding the friction member, an operating shaft, said shaft being mounted on the plate, and said cam slidably engaging said shaft.

3. A brake comprising a plate, a floating expansible friction member, a wedge shaped cam engaging the friction member, an operating shaft, said cam having a slidable connection with the shaft arranged parallel to the plate and means preventing relative rotative movement between the cam and shaft.

4. A brake comprising a plate, a floating expanding friction member, a wedge for expanding said friction member, said wedge being rotatable in a plane normal to the plate, and means on the plate for rotating the wedge.

5. A brake comprising a plate, an expanding friction member, a wedge rotatable in a plane normal to the plate for expanding the friction member, and means contacting with the friction member for urging the same radially outward when the brake is operated.

6. A brake comprising a plate, expansible friction elements rotatably supported on the plate by links secured to the inner portion of the friction elements, and wedge means for expanding the friction elements supported on the plate adjacent the periphery of the plate and rotatable in a plane normal to the plate.

7. A brake comprising a supporting plate, friction floating members having adjacent end portions, a symmetrical wedge shaped member rotatable in a plane normal to the plate between the end portions to expand the members, said end portions being circumferentially movable, and an operating member for actuating the wedge shaped member supported on the plate adjacent the periphery thereof.

8. A brake comprising a supporting plate, expansible friction members supported by the plate, a wedge for expanding said members equally in opposite directions, said wedge engaging the friction members by a radial movement, said expanding wedge having an operating shaft mounted on the supporting plate adjacent the periphery thereof, said wedge being circumferentially movable with the members, and operating means for the wedge mounted on the plate adjacent the periphery of the friction members.

9. A brake comprising a plate, a friction element on the plate having alined extensions, thrust members on the extensions and a floating operating member rotatable about an axis parallel to the plate and having an arcuate wedge extending between the thrust members.

10. A brake comprising a plate, a friction element on the plate having separable ends, thrust rollers on the separable ends, a floating operating member rotatable in a plane normal to the plate between the thrust rollers and means on the plate for actuating the operating member.

11. A brake comprising a plate, a friction element on the plate having separable ends provided with alined extensions, a thrust roller on the ends of each extension, a floating operating member rotatable in a plane normal to the plate between the thrust rollers and means arranged parallel to the plate for actuating the operating member.

12. A brake comprising a support, a drum floating friction means therein having separable adjacent ends, actuating means including a wedge for spreading the friction means, an anchor means for each direction of rotation mounted on said support and engaging said friction means, and a short pivoted radial extending link connecting each end of said friction means to said support.

13. A brake comprising a substantially tangentially supported shaft, a wedge-shaped cam splined on said shaft for axial movement, said wedge cam adapted to engage and axially spread apart a pair of adjacent shoes.

14. A brake comprising a support, a drum, floating friction means therefor having separable ends, anchoring means for said friction means adapted for partial self actuation of the brake, and a pair of substantially symmetrically arranged bell cranks pivoted to the support, one arm of each of said bell cranks being pivoted to the separable ends, and the other arm of the bell crank engaging the opposite sides of a floating actuating cam.

15. A brake actuating mechanism comprising a radially actuated cam free to float circumferentially, a pair of bell cranks engaging said cam on either side pivoted to a fixed support, and friction means secured to the free ends of said bell cranks.

LUCIEN HERSOT.